(12) United States Patent
Fukumoto et al.

(10) Patent No.: US 7,684,097 B2
(45) Date of Patent: Mar. 23, 2010

(54) RECORDING APPARATUS AND PHASE MODULATION DEVICE

(75) Inventors: Atsushi Fukumoto, Kanagawa (JP); Mikio Sugiki, Kanagawa (JP); Kenji Tanaka, Tokyo (JP); Masaaki Hara, Tokyo (JP); Kazuyuki Hirooka, Gunma (JP)

(73) Assignee: Sony Corporation, Tokyo (JP)

( * ) Notice: Subject to any disclaimer, the term of this patent is extended or adjusted under 35 U.S.C. 154(b) by 187 days.

(21) Appl. No.: 11/862,373

(22) Filed: Sep. 27, 2007

(65) Prior Publication Data

US 2008/0080030 A1 Apr. 3, 2008

(30) Foreign Application Priority Data

Oct. 3, 2006 (JP) ............................. 2006-272156

(51) Int. Cl.
*G03H 1/12* (2006.01)
*G03H 1/04* (2006.01)

(52) U.S. Cl. .............................. 359/11; 359/35; 359/10; 359/21

(58) Field of Classification Search ................... 359/10, 359/11, 21, 35
See application file for complete search history.

(56) References Cited

U.S. PATENT DOCUMENTS 6,674,555 B1 * 1/2004 Curtis et al. .................. 359/29

7,088,482 B2 * 8/2006 Edwards ....................... 359/11

FOREIGN PATENT DOCUMENTS

| JP | 2003-178460 | 6/2003 |
|---|---|---|
| JP | 2006-107663 | 4/2006 |
| JP | 2006-209081 | 8/2006 |

OTHER PUBLICATIONS

Japanese Office Action issued on Feb. 3, 2009 corresponding to JP Patent Application No. 2006-272156.

* cited by examiner

*Primary Examiner*—Audrey Y Chang
(74) *Attorney, Agent, or Firm*—Sonnenschein Nath & Rosenthal LLP

(57) ABSTRACT

A recording apparatus performing at least recording with respect to a hologram recording medium is disclosed. The recording medium includes: a light emitting means for emitting light to be radiated with respect to the hologram recording medium set at a prescribed position; a spatial light modulation means configured to be able to generate reference light and signal light to be radiated to the hologram recording medium by performing light intensity modulation to incident light in the unit of pixels; a phase modulation means for performing phase modulation to radiated light from the spatial light modulation means; and an optical system configured to guide light emitted from the light emitting means with respect to the hologram recording medium through the spatial modulation means and the phase modulation means.

3 Claims, 6 Drawing Sheets

DISCRETE PHASE STRUCTURE

CONTINUOUS PHASE STRUCTURE
(PHASE STRUCTURE OF SIGNAL LIGHT)

RECORDING APPARATUS AND PHASE MODULATION DEVICE

CROSS REFERENCE TO RELATED APPLICATIONS

The present invention contains subject matter related to Japanese Patent Application JP 2006-272156 filed in the Japanese Patent Office on Oct. 3, 2006, the entire contents of which being incorporated herein by reference.

BACKGROUND OF THE INVENTION

1. Field of the Invention

The invention relates to a recording apparatus at least capable of recording with respect to a hologram recording medium and a phase modulation device preferable to be used in the recording apparatus.

2. Description of the Related Art

In a hologram recording/playback system, particularly in a hologram recording/playback system in a field of optical storage, a SLM (spatial light modulator) such as a liquid-crystal panel or DMD (Digital Micromirror Device) is used as light intensity modulation is used, in which intensity modulation whereby a pattern arrangement of a bit 1 (for example, light intensity=high) and a bit 0 (for example, light intensity=low) can be obtained is applied to signal light.

At this time, in the SLM, signal light which received the light intensity modulation according to recorded data is formed at the central part and reference light transmitted so as to make a circle around the signal light is formed as shown in FIG. 2. The signal light modulated according to recorded data is radiated to the hologram recording medium with the reference light, accordingly, interference fringes of signal light and reference light are recorded in the hologram recording medium as data.

At the time of playing back data, only the reference light is generated in the SLM and is radiated to the hologram recording medium to obtain diffracted light according to the interference fringes. Images according to the diffracted light are focused on an image sensor such as a CCD (Charge Coupled Device) sensor or a CMOS (Complementary Oxide Semiconductor) sensor to perform image detection. Playback data is obtained based on image data detected in this manner.

A hologram recording/playback system in which signal light and reference light are radiated on the same optical axis is known as a coaxial system (or a collinear system).

In related arts, when such coaxial system is applied, a phase modulation by a phase mask is further given to a real-image side thereof to which spatial light modulation is applied in the SLM as described in JP-A-2006-107663(Patent Document 1).

The phase modulation by the phase mask is performed with respect to both signal light and reference light. The reason that the phase modulation is performed to the reference light is for enabling multiple recording in the hologram recording medium as described in Patent Document 1. That is, signal light (data) recorded by using reference light including a certain phase structure can be read out only by radiating reference light having the same phase structure at the time of playback. Therefore, applying the above, data is respectively recorded by using reference lights having different phase structures at the time of recording and the multiple-recorded data can be selectively read out by selectively radiating the reference lights having these phase structures at the time of playback.

In addition, the reason that the phase modulation is given to the signal light is for performing interference control and for suppressing a DC component with respect to the signal light in the hologram recording medium to increase the recording density.

The invention described in Patent Document 1 intends to perform the optimum phase modulation to signal light and reference light respectively by allowing a phase structure given to signal light and a phase structure given to reference light to be different patterns respectively.

SUMMARY OF THE INVENTION

In related arts, when performing the phase modulation by the phase mask to light which has received the SLM modulation as described above, the phase modulation was performed on the premise that phase structures of both signal light and reference light were allowed to be a discrete phase structure as described in Patent Document 1. That is, the phase modulation was performed on the premise that the phase structure by two values "0" and "1" was given in the unit of pixels of the SLM, for example, as shown in FIG. 5.

Concerning to the reference light, it is difficult to perform recording/playback of data properly unless phase structures are the same at the time of recording and playback as described above, therefore, it is difficult to obtain compatibility between recording and playback unless the phase structures correspond to each other in the unit of pixels at each recording/playback and between respective apparatuses.

According to the above, it is necessary that the discrete phase structure is applied as the phase structure of the reference light, in which the phase varies by two values in the unit of pixels as described above.

However, it is not always necessary that the phase structure of signal light is made to be the discrete structure in which correspondence in the unit of pixels is necessary as long as the phase structure can perform interference control and suppression of the DC component in signal light.

When applying the discrete phase structure, signal light may deteriorate if positional correspondence between a phase mask pattern and respective pixels of the SLM deviates from the one previously determined even slightly, therefore, it is necessary to allow the positional relation between the phase mask pattern and respective pixels of the SLM to correspond accurately.

Accordingly, in the case of applying the discrete phase structure, it is necessary to secure relatively high positional accuracy in the pixel size level when forming the phase mask pattern, which leads to yield deterioration, reduction of manufacturing efficiency and the like.

The invention addresses the above-identified, and other problems associated with the related-art recording apparatus.

According to an embodiment of the invention, there is provided a recording apparatus performing at least recording with respect to a hologram recording medium, including, first, a light emitting means for emitting light to be radiated with respect to the hologram recording medium set at a prescribed position.

The apparatus also includes a spatial light modulation means configured to be able to generate reference light and signal light to be radiated to the hologram recording medium by performing light intensity modulation to incident light in the unit of pixels.

The apparatus also includes a phase modulation means for performing phase modulation to radiated light from the spatial light modulation means, in which a phase mask pattern giving a discrete phase structure to the reference light is formed at a reference light area to which the reference light from the spatial light modulation means is incident, and a phase mask pattern giving a continuous phase structure to the signal light is formed at a signal light area to which the signal light is incident.

The apparatus further includes an optical system configured to guide light emitted from the light emitting means with respect to the hologram recording medium through the spatial modulation means and the phase modulation means.

According to an embodiment of the invention, the phase mask pattern for giving the discrete phase structure is formed at the reference light area as in the past in the phase modulation means (phase modulation device) for performing phase modulation to signal light and reference light, thereby allowing phase structures of reference light at each recording/playback and between apparatuses to correspond to each other, as a result, compatibility at each recording/playback and between apparatuses can be secured.

In addition, the phase mask pattern for giving the continuous phase structure is formed at the signal light area, thereby preventing quality deterioration of signal light when applying the discrete structure even when the positional relation between the formed phase mask pattern and respective pixels of the spatial light modulation means is deviated from the predetermined positional relation.

According to an embodiment of the invention, compatibility at each recording/playback and between apparatuses can be secured as in the past by forming the phase mask pattern for giving the discrete phase structure at the reference light area. In addition, the phase mask pattern for giving the continuous phase structure is formed at the signal light area, thereby setting the phase mask pattern without considering positional relation between the phase mask pattern and respective pixels of the spatial light modulation means.

In the case of co-axial system, data recorded by signal light modulated in any phase structure can be properly played back as long as only reference light is modulated in the same phase structure. Therefore, according to an embodiment of the invention in which it is not necessary to consider the positional relation between the phase mask pattern and respective pixels for the prevention of quality deterioration of signal light as described above, the phase mask pattern in the signal light area can be set freely as long as original purposes (for example, interference control, suppression of the DC component in the signal light and the like) are realized.

According to an embodiment of the invention, the degree of freedom in fabrication of the phase mask pattern at the signal light area in the phase modulation means (device) can be increased as well as fabrication accuracy can be alleviated because positioning in the unit of pixels becomes unnecessary as described above and manufacturing processes can be simplified as well.

DESCRIPTION OF THE PREFERRED EMBODIMENTS

Hereinafter, the best mode for carrying out the invention (hereinafter, referred to as an embodiment) will be explained.

Figure 1:
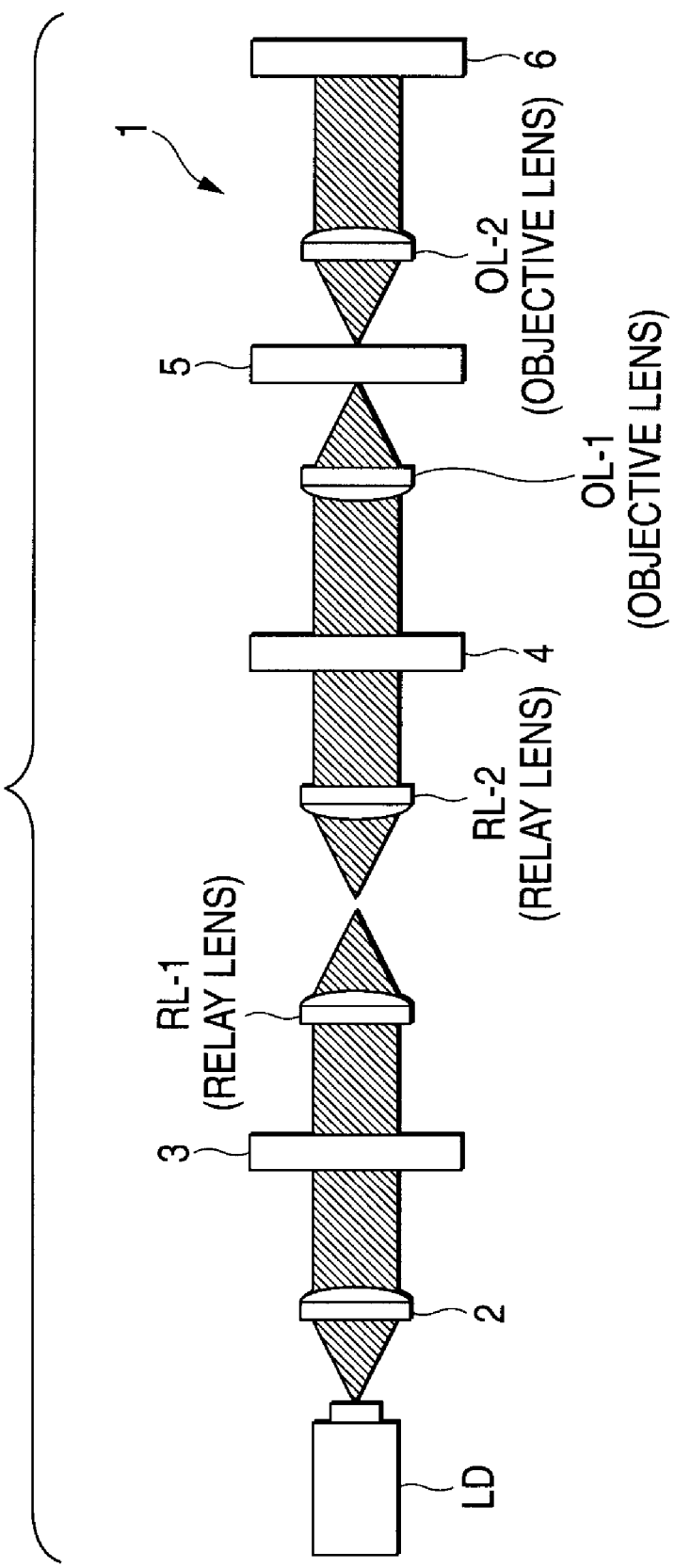
FIG. 1 is a block diagram showing a configuration of a relevant part of a recording apparatus according to an embodiment.

FIG. 1 is a block diagram showing an internal configuration of a recording/playback apparatus 1 as an embodiment of a recording apparatus of an embodiment of the invention. In FIG. 1, only a configuration of an optical system in the recording/playback apparatus 1 is mainly extracted and shown, and the other parts are omitted.

First, in the embodiment, a so-called coaxial system is applied as a hologram recording/playback system, in which signal light and reference light are arranged on the same axis and they are radiated to a hologram recording medium 5 at the same time to perform data recording by interference fringes and only reference light is radiated to the hologram recording medium 5 to perform playback of recorded data by interference fringes at the time of playback.

As a configuration for the above system, first, a recording/playback apparatus 1 is provided with a laser diode LD shown in the drawing. The laser diode LD is a light source for obtaining laser light for recording/playback, outputting laser light having a wavelength of one prescribed kind as a so-called single mode laser in this case.

Radiated light from the laser diode LD is converted into parallel light by being transmitted through a collimator lens 2 to be led to a SLM (spatial light modulator) 3. The SLM 3 includes, for example, a transmissive liquid crystal panel.

In the embodiment, light to which spatial light modulation is performed by the SLM 3 is incident to a phase mask 4 arranged at an real-image surface of the SLM 3 by relay lenses RL-1, RL-2, where prescribed phase modulation is performed. The light to which the phase modulation is performed by the phase mask 4 is transmitted through an objective lens OL-1 to be incident to the hologram recording medium 5 set at the prescribed position.

At the time of recording, modulation according to recording data is performed in the SLM 3 as described later, and the parallel light received such modulation is further phase-modulated in the phase mask 4, then, transmitted through the objective lens OL-1 to be a convergent light, and collected in the hologram recording medium 5.

At the time of playback, light from the laser diode LD is radiated to the hologram recording medium 5 by the above course, thereby obtaining diffraction light in accordance with recorded data as described later. The diffraction light is made to be the parallel light through an objective lens OL-2, then, focusing on an image sensor 6 such as a CCD (Charge Coupled Device) sensor or a CMOS (Complementary Oxide Semiconductor) sensor.

Figure 2:
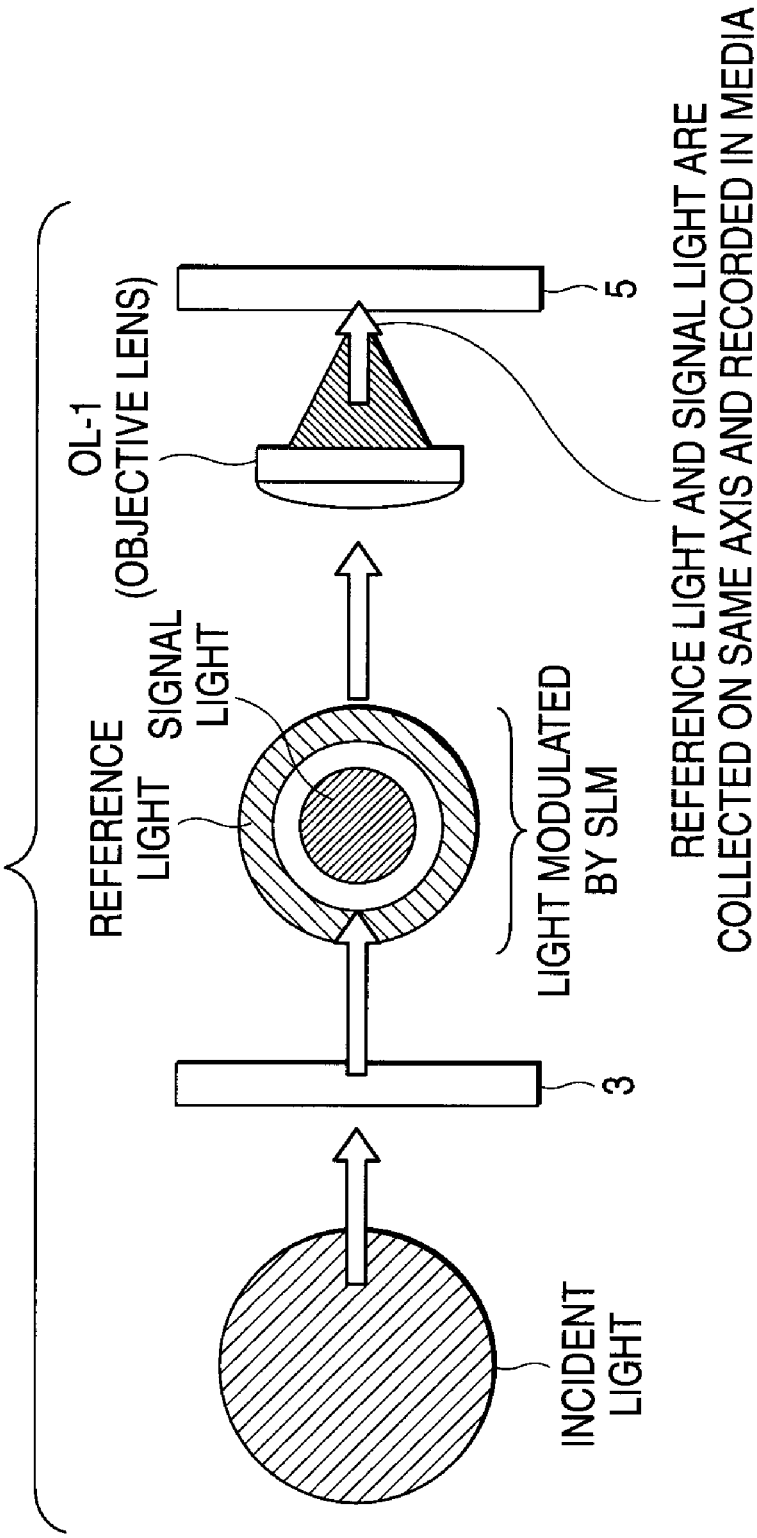
FIG. 2 is a block diagram for explaining a recording method in a hologram recording medium.

FIG. 2 is a block diagram for explaining a method of recording data in the hologram recording medium 5 by the recording/playback apparatus 1 shown in FIG. 1. In the drawing, the looks of the SLM 3, the objective lens OL-1 and the hologram recording medium 5 shown in FIG. 1, parallel light (incident light) radiated from the collimator lens 2 and incident to the SLM 3, light obtained after modulation by the SLM 3 and light radiated from the objective light OL-1 to the hologram recording medium 5 are schematically shown.

As shown in FIG. 2, in the recording method in this case, intensity modulation is performed to the incident light from the collimator lens 2 in the SLM 3 at first, which is for arranging the above-described reference light and light in which data array of "0" and "1" is formed based on recorded data (hereinafter, referred to as signal light) on concentric circles. The light whose intensity was modulated is collected on the hologram recording medium 5 by the objective lens OL-1, and interference fringes of the reference light and signal light thereby formed are recorded on the hologram recording medium 5 as data.

Figure 3:
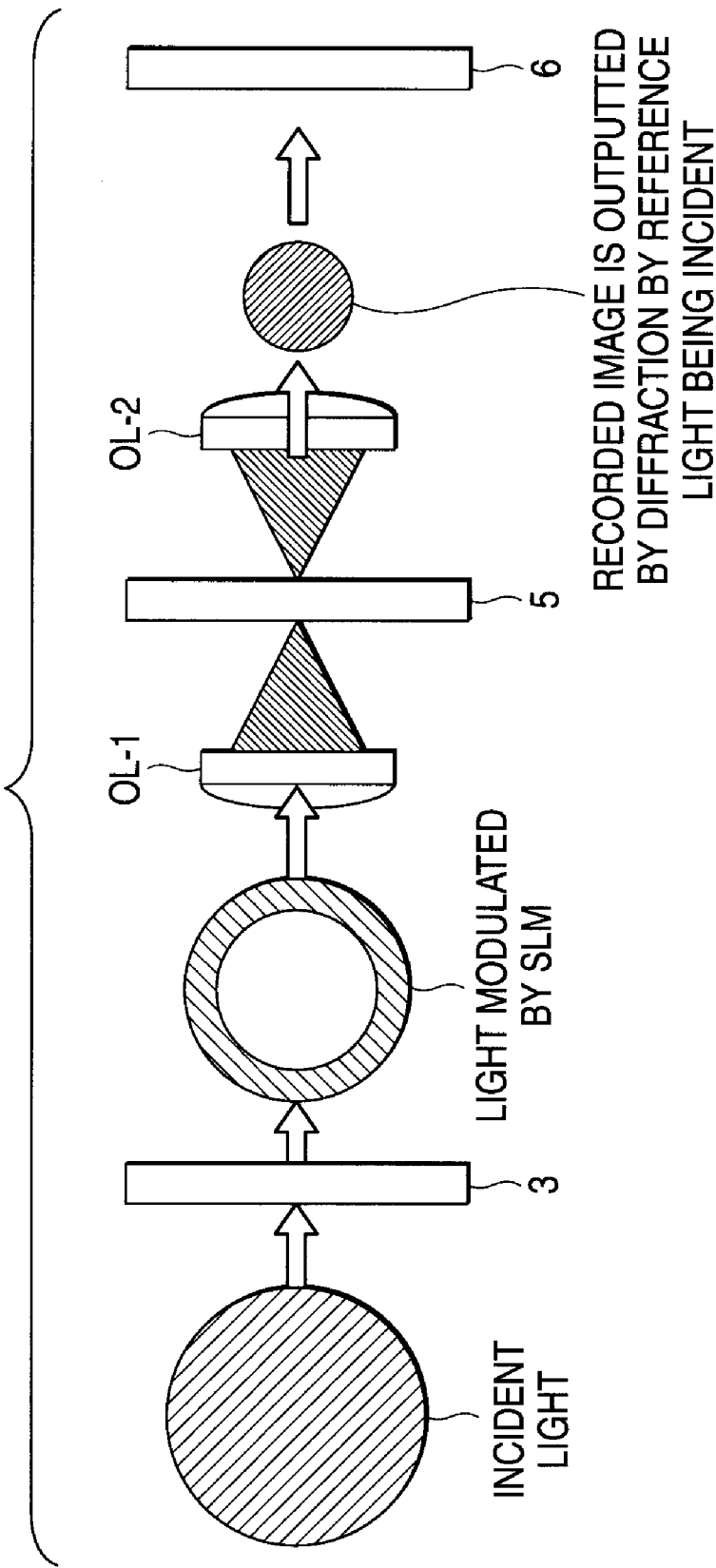
FIG. 3 is a block diagram for explaining a playback method from the hologram recording medium.

FIG. 3 is a block diagram for explaining a method of playing back data of the hologram recording medium 5 by the recording/playback apparatus 1. In FIG. 3, the looks of the SLM 3, the objective lens OL-1 and the hologram recording medium 5, the objective lens OL-2, the image sensor 6 shown in FIG. 1, parallel light (incident light) radiated from the collimator lens 2 and incident to the SLM 3, light obtained after modulation by the SLM 3, light radiated from the objective light OL-1 to the hologram recording medium 5, and diffraction light emitted from the hologram recorded medium 5 are schematically shown.

In FIG. 3, at the time of playing back, intensity modulation is performed to the incident light from the collimator lens 2 in the SLM 3 so that only a reference light pattern is outputted and the light is collected on the hologram recording medium 5. At that time, the collected light is diffracted by interference fringes according to data pattern recorded in the hologram recording medium 5 and outputted so as to be transmitted through the hologram recording medium 5. That is, the diffracted light has an intensity modulation pattern reflecting recorded data as shown in the drawing, and data is played back based on the result in which the image sensor 6 detects the intensity modulation pattern included in the diffracted light.

As shown in previous FIG. 1, the recording/playback apparatus 1 according to an embodiment is provided with the phase mask 4 for performing phase modulation with respect to the radiated light from the SLM 3. The phase mask 4 is provided for performing phase modulation to both the signal light and the reference light for the same purpose as the one provided from the past.

The reason that the phase modulation is performed to the reference light radiated from the SLM 3 is for enabling multiple recording in the hologram recording medium 5. As previously described, signal light (data) recorded by using reference light including a certain phase structure can be read out only by radiating reference light having the same phase structure at the time of playback. Therefore, applying the above, data is respectively recorded by using reference lights having different phase structures at the time of recording and the multiple-recorded data can be selectively read out by selectively radiating the reference lights having these phase structures at the time of playback.

In addition, the reason that the phase modulation is performed to the signal light is for controlling interference and for suppressing a DC component with respect to signal light to increase the recording density in the hologram recording medium 5.

However, as shown in previous Patent Document 1, when performing phase modulation using the phase mask to the light modulated by the SLM 3 as described above, a discrete phase structure was given to both the signal light and the reference light in the related art. That is, also shown in FIG. 5 later, the phase modulation was performed on the premise that the phase structure which varies, for example, by two values "0" and "1" in the unit of pixels of the SLM 3 is given.

As previously described, concerning the reference light, it is difficult to perform recording/playback of data properly unless phase structures are the same at the time of recording and playback, therefore, it is difficult to obtain compatibility between recording and playback unless the phase structures correspond to each other in the unit of pixels at each recording/playback and between respective apparatuses.

Accordingly, it is necessary that the discrete phase structure in the unit of pixels is applied as the phase structure of the reference light as described above. When applying the discrete structure, a phase mask pattern can be formed with high positional accuracy as described in the precedent Patent Document 1.

However, it is not always necessary that the phase structure of signal light is made to be the discrete structure as long as the phase structure can perform interference control and suppression of the DC component in the signal light. In the case that the discrete phase structure is applied as the phase structure of the signal light, the signal light deteriorates when positional correspondence between the phase mask pattern of the phase mask 4 and respective pixels of the SLM 3 is deviated even slightly, therefore, it is necessary to allow positional relation between the phase mask pattern of the phase mask 4 and the respective pixels of the SLM 3 to accurately correspond.

Considering the above, when applying the discrete phase structure, it is necessary to secure relatively high positional accuracy in the pixel size level when fabricating the phase mask pattern of the phase mask 4 for the signal light, and there is the fear of incurring deterioration of yield and reduction of manufacturing efficiency.

In the embodiment, concerning a reference light area to which reference light from the SLM 3 is radiated, the phase mask pattern of the phase mask 4 is formed so as to obtain the discrete phase structure as in the past, and concerning a signal light area to which signal light is radiated, the phase mask pattern is formed so as to obtain a continuous phase structure.

Figure 4:
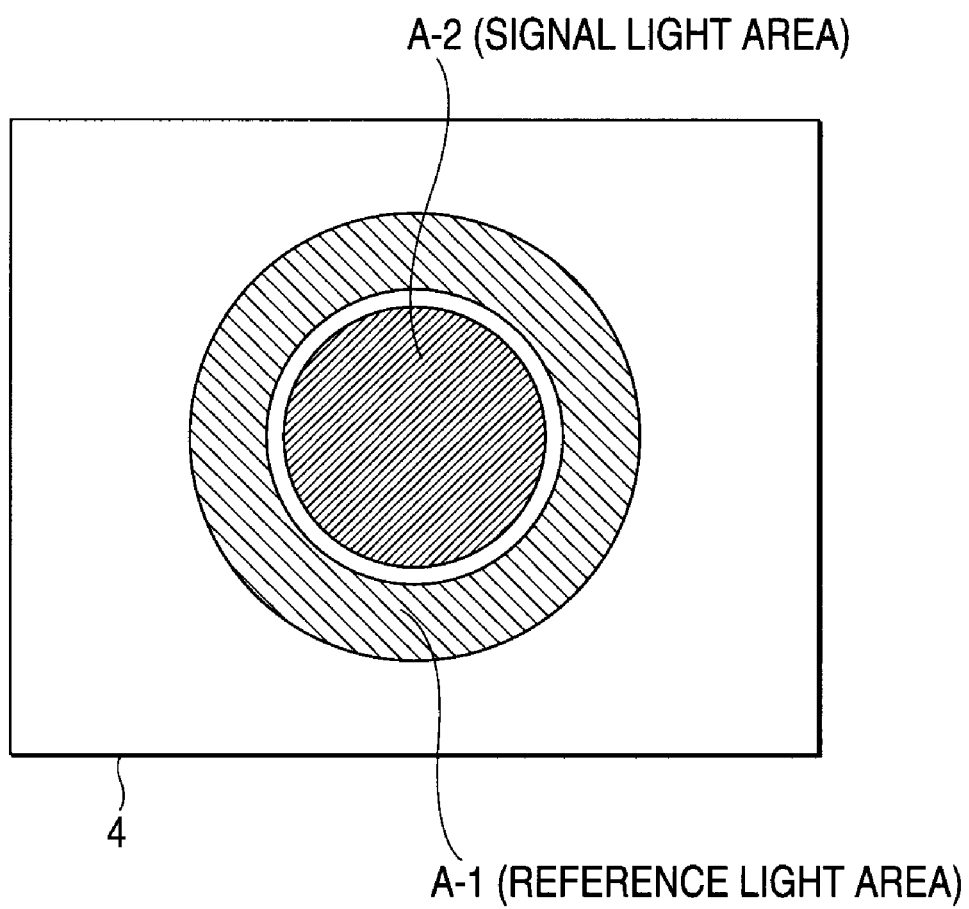
FIG. 4 is a plan view showing a phase mask.

First, referring to FIG. 4, the reference light area and the signal light area in the phase mask 4 will be explained. FIG. 4 is a plan view showing the phase mask 4. As shown in FIG. 4, an area to which the reference light from the SLM 3 is radiated in the phase mask 4 is denoted as a reference light area A-1. Similarly, an area to which the signal light from the SLM 3 is radiated is denoted as a signal light area A-2.

Figure 5:
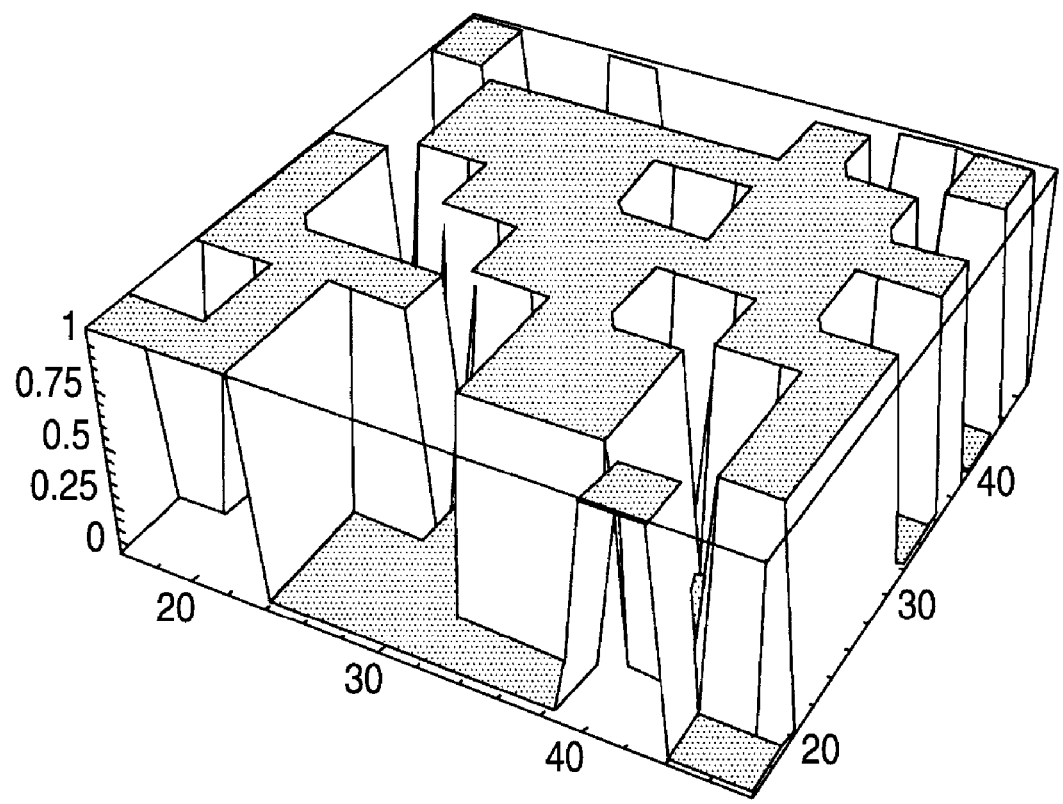
FIG. 5 is a view for explaining a discrete phase structure.

As described above, the phase mask pattern of the reference light area A-1 is formed so that the discrete phase structure shown in next FIG. 5 as a three-dimensional perspective view of the phase structure is given.

Specifically, for example, phase variation by two values "0" and "1" as shown in the drawing is given.

For example, the phase structure in which phases vary by two values such as "0" and "1" is referred to as the "discrete phase structure" in the specification.

To apply such discrete structure enables positional accuracy in the unit of pixels to be kept relatively high. That is, the high positional accuracy can be secured in this manner, thereby securing the identity of reference light at each recording/playback and between apparatuses as described above with high accuracy, which stabilizes the securement of compatibility.

Figure 6:
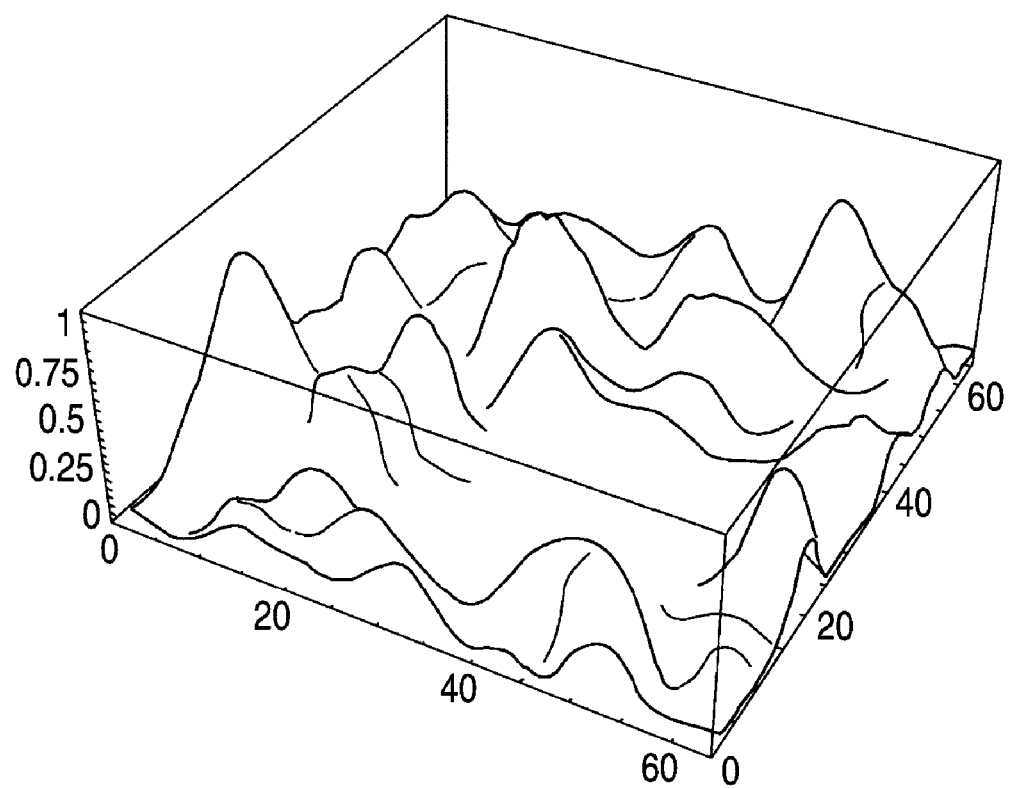
FIG. 6 is a view for explaining a continuous phase structure.

On the other hand, the phase mask pattern of the signal light region A-2 is formed so that the continuous phase structure shown in next FIG. 6 as a three-dimensional perspective view of the phase structure is given. That is, as shown in the drawing, the phase structure in which phases vary not by two values but continuously is given.

The phase structure in which phase variation is continuous, which is different from the precedent discrete phase structure of two-value variation, is referred to as the "continuous phase structure" in the specification.

To apply the continuous phase structure prevents quality deterioration of signal light such as occurring in the case of the discrete phase structure in the past even when the positional relation between the phase mask pattern formed in the signal light area A-2 and respective pixels of the SLM 3 is deviated from the positional relation previously determined.

According to the phase mask 4 of the embodiment, while the compatibility at each recording/playback and between apparatuses is secured as in the past by the discrete phase structure of the reference light as described above, the phase mask pattern of the signal light area A-2 can be set by the continuous phase structure of the signal light without considering positional correspondence with respect to respective pixels of the SLM 3.

In the case of the coaxial system as described above, given data recorded by signal light having any phase structure can be properly played back as long as only reference light is modulated in the same phase structure. According to the embodiment in which it is not necessary to consider positional correspondence with respect to respective pixels for preventing the quality deterioration of the signal light as described above, the phase mask pattern of the signal light area A-2 can be set freely as long as original purposes (for example, interference control, suppression of the DC component in the signal light and the like) are achieved.

Therefore, according to the embodiment, the degree of freedom in fabrication of the phase mask pattern of the signal light area A-2 in the phase mask 4 can be increased as well as fabrication accuracy is alleviated because positioning in the unit of pixels is not necessary as described above and manufacturing processes of the phase mask 4 are simplified. In addition, manufacturing costs of the phase mask 4 can be reduced by such simplification of manufacturing processes.

An example of a method of manufacturing the phase mask 4 for giving the continuous structure to signal light will be described. First, a resist is coated on a prescribed material having transparency such as glass, then, bulk exposure by ultraviolet light by using a gray (dark and light) is performed. After that, the exposed portion is removed and the phase mask pattern is formed in the prescribed material by etching.

As can be seen from the above explanation, concerning the reference light area A-1 in the phase mask 4 according to the embodiment, it is necessary that positional correspondence with respect to the area in which reference light is transmitted in the SLM 3 corresponds to the positional relation previously determined in the unit of pixels. At this point, it is preferable that the phase mask 4 is provided so as to be positioned and fixed at the SLM 3 in the aspect of easiness for securing positional accuracy in the unit of pixels, rather than that the phase mask 4 is provided apart from the SLM 3.

Even in the case that the SLM 3 and the phase mask 4 are provided apart from each other as shown in FIG. 1, it does not matter when optical magnification and positional relation are adjusted so that positional correspondence on the phase mask 4 with respect to the area in which reference light is transmitted in the SLM 3 correspond to the positional relation previously determined.

The embodiment of the invention has been explained as the above, and the invention is not limited to the above embodiment.

For example, in the embodiment, the case in which the recording/playback apparatus 1 applies the configuration corresponding to the transmissive hologram recording medium was explained, however, it is also preferable that the apparatus applies a configuration corresponding to a reflective hologram recording medium having a reflective film. In that case, the configuration is different from the one which has been shown in previous FIG. 1, in which reference light and signal light passed through the SLM3→the phase mask 4 is made incident to a polarizing beam splitter, and the light transmitted through the polarizing beam splitter is radiated to the reflective hologram recording medium through the objective lens to perform recording. At the time of playback, diffracted light according to reflected light obtained by reference light being radiated to the reflective hologram recording medium by the course similar to the above is made incident to the objective lens which is common at the time of recording. The reflected light by parallel light obtained through the objective lens is reflected by the polarizing beam splitter to lead the reflected light to the side of the image sensor 6.

In the embodiment of the invention, the case in which the recording apparatus is configured to be the recording/playback apparatus which can also play back the hologram recording medium was explained, however, it is also preferable that the apparatus is configured to be an apparatus for recording only. In that case, configurations for playback such as the objective lens OL-2, the image sensor 6 and the like can be omitted.

In previous FIG. 4, the binary random phase structure was explained as the phase structure to be given to the reference light, however, it is also preferable to apply another structure as the phase structure to be given to the reference light if it is the discrete phase structure.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus performing at least recording with respect to a hologram recording medium, comprising:
   a light emitting means for emitting light to be radiated with respect to the hologram recording medium set at a prescribed position;
   a spatial light modulation means configured to generate reference light and signal light to be radiated to the hologram recording medium by performing light intensity modulation to incident light in the unit of pixels;
   a phase modulation means for performing phase modulation to radiated light from the spatial light modulation means, the phase modulation means including an optical element having a first phase mask pattern and a second phase mask pattern, the first phase mask pattern giving a discrete phase structure to the reference light is formed at a reference light area of the optical element to which the reference light from the spatial light modulation means is incident, and the second phase mask pattern giving a continuous phase structure to the signal light is formed at a signal light area of the optical element to which the signal light is incident; and
   an optical system configured to guide light emitted from the light emitting means with respect to the hologram recording medium through the spatial modulation means and the phase modulation means.

2. A phase modulation device for a recording apparatus which includes a spatial light modulation means configured to generate reference light and signal light to be radiated to a hologram recording medium by performing light intensity modulation to at least incident light in the unit of pixels, and performs at least recording with respect to the hologram recording medium, the phase modulation device performing phase modulation to radiated light from the spatial modulation means in the recording apparatus and including an optical element having a first phase mask pattern and a second phase mask pattern, wherein the first phase mask pattern is formed at a reference light area of the optical element to which the reference light from the spatial light modulation means is incident and provides a discrete phase structure to the reference light, and wherein the second phase mask pattern is formed at a signal light area of the optical element to which the signal light is incident and provides a continuous phase structure to the reference light.

3. A recording apparatus performing at least recording with respect to a hologram recording medium, comprising:

a light emitting section emitting light to be radiated with respect to the hologram recording medium set at a prescribed position;

a spatial light modulation section configured to generate reference light and signal light to be radiated to the hologram recording medium by performing light intensity modulation to incident light in the unit of pixels;

a phase modulation section performing phase modulation to radiated light from the spatial light modulation section, the phase modulation section including an optical element having a first phase mask pattern and a second phase mask pattern, the first phase mask pattern giving a discrete phase structure to the reference light is formed at a reference light area of the optical element to which the reference light from the spatial light modulation section is incident, and the second phase mask pattern giving a continuous phase structure to the signal light is formed at a signal light area of the optical element to which the signal light is incident; and an optical system configured to guide light emitted from the light emitting section with respect to the hologram recording medium through the spatial modulation section and the phase modulation section.

* * * * *